United States Patent
Yoo et al.

(10) Patent No.: US 10,524,279 B2
(45) Date of Patent: Dec. 31, 2019

(54) JOINT COMP WITH MULTIPLE OPERATORS

(71) Applicant: QUALCOMM Incorporated, San Diego, CA (US)

(72) Inventors: Taesang Yoo, Riverside, CA (US); Xiaoxia Zhang, San Diego, CA (US); Jing Sun, San Diego, CA (US); Siddhartha Mallik, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/499,570

(22) Filed: Apr. 27, 2017

(65) Prior Publication Data

US 2018/0027580 A1 Jan. 25, 2018

Related U.S. Application Data

(60) Provisional application No. 62/365,792, filed on Jul. 22, 2016.

(51) Int. Cl.
*H04W 72/12* (2009.01)
*H04L 5/00* (2006.01)
(Continued)

(52) U.S. Cl.
CPC ....... *H04W 72/1231* (2013.01); *H04L 5/0035* (2013.01); *H04L 5/0053* (2013.01);
(Continued)

(58) Field of Classification Search
CPC .......................... H04B 7/024; H04W 72/1231
(Continued)

(56) References Cited

U.S. PATENT DOCUMENTS 9,008,010 B2 4/2015 Frenger et al.
9,455,772 B2 9/2016 Senarath et al.
(Continued)

FOREIGN PATENT DOCUMENTS

| EP | 2523360 A1 | 11/2012 |
|---|---|---|
| WO | WO-2015076938 A1 | 5/2015 |
| WO | WO-2016091073 A1 | 6/2016 |

OTHER PUBLICATIONS

International Search Report and Written Opinion—PCT/US2017/042813—ISA/EPO—Dec. 18, 2017.
(Continued)

*Primary Examiner* — Peter G Solinsky
(74) *Attorney, Agent, or Firm* — Norton Rose Fulbright LLP

(57) ABSTRACT

Joint aspects of coordinated multiple (CoMP) operations is discussed between multiple entities that may be in different CoMP clusters or even deployed by different operators. Participating base stations obtain channel related information such as sounding reference signals (SRS), channel state information (CSI), and the like from one or more neighbor user equipments (UE) served by a different base station. The base station determines a channel estimate at the neighbor UEs using the channel related information and selects a beamforming vector and schedules downlink transmissions to a served UE based on the channel estimates incorporating the channels of the other neighbor UEs. The selected beamforming vectors and transmission schedules minimizes the interference at the neighbor UEs.

26 Claims, 7 Drawing Sheets

(51) Int. Cl.
*H04L 25/02* (2006.01)
*H04W 28/02* (2009.01)
*H04W 72/04* (2009.01)
*H04W 72/08* (2009.01)

(52) U.S. Cl.
CPC ..... *H04L 25/0204* (2013.01); *H04W 28/0236* (2013.01); *H04W 72/046* (2013.01); *H04W 72/0413* (2013.01); *H04W 72/082* (2013.01)

(58) Field of Classification Search
USPC ........................................................ 370/230
See application file for complete search history.

(56) References Cited

U.S. PATENT DOCUMENTS

| | | | |
|---|---|---|---|
| 2015/0381388 A1* | 12/2015 | Zirwas | H04L 5/001 370/330 |
| 2016/0037550 A1* | 2/2016 | Barabell | H04B 17/318 455/450 |
| 2016/0174217 A1* | 6/2016 | Salem | H04W 72/0446 455/454 |
| 2016/0198395 A1* | 7/2016 | Hou | H04W 48/16 455/434 |
| 2016/0269940 A1 | 9/2016 | Takeda et al. | |
| 2016/0286603 A1 | 9/2016 | Vajapeyam et al. | |
| 2016/0295554 A1 | 10/2016 | Ko et al. | |
| 2017/0265057 A1* | 9/2017 | Zhang | H04W 60/00 |
| 2018/0199290 A1* | 7/2018 | Bang | H04W 24/02 |

OTHER PUBLICATIONS

Partial International Search Report—PCT/US2017/042813—ISA/EPO—Oct. 5, 2017.

* cited by examiner

JOINT COMP WITH MULTIPLE OPERATORS

CROSS-REFERENCE TO RELATED APPLICATIONS

This application claims the benefit of U.S. Provisional Patent Application No. 62/365,792, entitled, "JOINT COMP WITH MULTIPLE OPERATORS," filed on Jul. 22, 2016, which is expressly incorporated by reference herein in its entirety.

BACKGROUND

Field

Aspects of the present disclosure relate generally to wireless communication systems, and more particularly, to joint cooperative multipoint with multiple operators.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes obtaining channel related information at a base station from one or more neighbor UEs served by one or more different base stations, determining a channel estimate of the one or more neighbor UEs using the channel related information, and selecting a beamforming vector and scheduling transmission to a served UE based on the channel estimate, wherein the selected beamforming vector and transmission schedule minimizes interference at the one or more neighbor UEs by the base station.

In an additional aspect of the disclosure, an apparatus configured for wireless communication includes means for obtaining channel related information at a base station from one or more neighbor UEs served by one or more different base stations, means for determining a channel estimate of the one or more neighbor UEs using the channel related information, and means for selecting a beamforming vector and means for scheduling transmission to a served UE based on the channel estimate, wherein the selected beamforming vector and transmission schedule minimizes interference at the one or more neighbor UEs by the base station.

In an additional aspect of the disclosure, a non-transitory computer-readable medium having program code recorded thereon. When executed by a computer, the program code creates an execution environment that performs the functions defined by the code. The program code includes code to obtain channel related information at a base station from one or more neighbor UEs served by one or more different base stations, code to determine a channel estimate of the one or more neighbor UEs using the channel related information, and code to select a beamforming vector and code to schedule transmission to a served UE based on the channel estimate, wherein the selected beamforming vector and transmission schedule minimizes interference at the one or more neighbor UEs by the base station.

In an additional aspect of the disclosure, an apparatus configured for wireless communication is disclosed. The apparatus includes at least one processor, and a memory coupled to the processor. The processor is configured to obtain channel related information at a base station from one or more neighbor UEs served by one or more different base stations, to determine a channel estimate of the one or more neighbor UEs using the channel related information, and to select a beamforming vector and to schedule transmission to a served UE based on the channel estimate, wherein the selected beamforming vector and transmission schedule minimizes interference at the one or more neighbor UEs by the base station.

In a further aspect of the disclosure, a method of wireless communication includes obtaining channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations. The method additionally includes determining channel estimates for the one or more neighbor UEs and the one or more served UEs using the channel related information. The method also includes selecting beamforming vectors and scheduling downlink transmission to the one or more served UEs based on the channel estimates, wherein the selected beamforming vectors and scheduled downlink transmission by the base station of the first CoMP network minimize interference at the one or more neighbor UEs.

In a further aspect of the disclosure, an apparatus configured for wireless communication includes means for obtaining channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations. The apparatus additionally includes means for determining channel estimates for the one or more neighbor UEs and the one or more served UEs using the channel related information. The apparatus also includes means for selecting beamforming vectors and means for scheduling downlink transmission to the one or more served UEs based on the channel estimates, wherein the selected beamforming vectors and scheduled downlink transmission by the base station of the first CoMP network minimize interference at the one or more neighbor UEs.

In a further aspect of the disclosure, a non-transitory computer-readable medium having program code recorded thereon. The program code includes program code executable by a computer for causing the computer to obtain channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations. The program code also includes program code executable by the computer for causing the computer to determine channel estimates for the one or more neighbor UEs and the one or more served UEs using the channel related information. The program code additionally includes program code executable by the computer for causing the computer to select beamforming vectors and program code executable by the computer for causing the computer to schedule downlink transmission to the one or more served UEs based on the channel estimates, wherein the selected beamforming vectors and scheduled downlink transmission by the base station of the first CoMP network minimize interference at the one or more neighbor UEs.

In a further aspect of the disclosure, an apparatus configured for wireless communication includes at least one processor and a memory coupled to the at least one processor. The at least one processor is configured to obtain channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations. The at least one processor is additionally configured to determine channel estimates for the one or more neighbor UEs and the one or more served UEs using the channel related information. The at least one processor is also configured to select beamforming vectors and program code executable by the at least one processor for causing the at least one processor to schedule downlink transmission to the one or more served UEs based on the channel estimates, wherein the selected beamforming vectors and scheduled downlink transmission by the base station of the first CoMP network minimize interference at the one or more neighbor UEs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
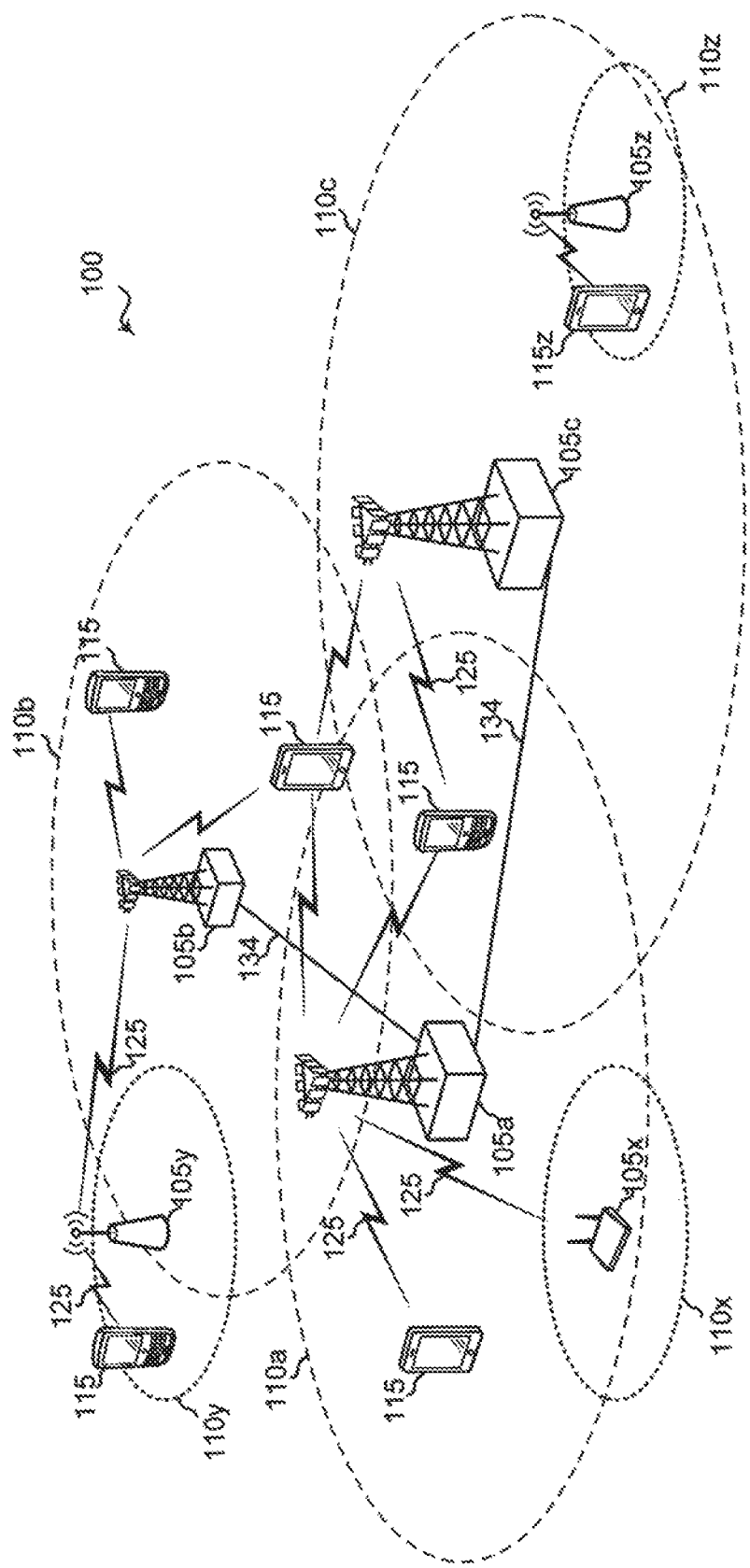
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
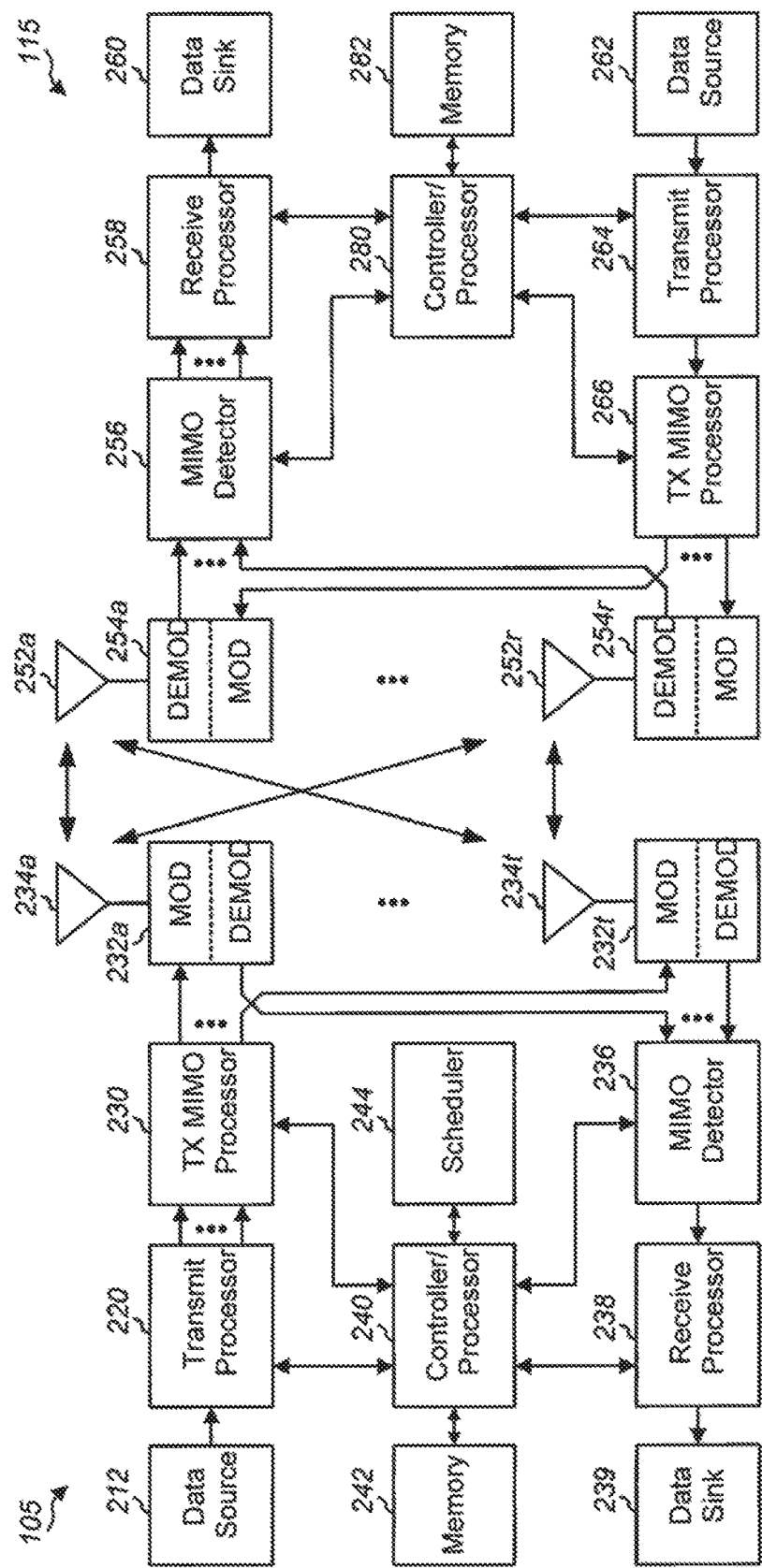
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the eNB 105 and the UE 115, respectively. A scheduler 244 may schedule UEs for data transmission on the downlink and/or uplink.

Coordinated Multi-Point (CoMP) transmission is a technology initially defined in 3gpp Rel-10 (LTE-A). CoMP is a general framework designed to reduce cell-edge interference, improve cell-edge spectrum efficiency and enlarge effective cell-edge coverage by means of multi-point coordination including coordination between various transmission entities, such as remote radio heads (RRHs), relays, and eNBs. CoMP techniques may be divided into two general categories: coordinated scheduling/beamforming (CS/CB) and joint processing. In CS/CB CoMP, the data packets to be conveyed to a UE may be available at and transmitted from one eNB in a CoMP cluster (the set of transmitters—eNBs, RRHs, relays, etc.—involved in communication with a given UE), whereas user scheduling and beamforming decisions may be made dynamically after the coordination among the points in the cooperating cluster. Joint processing provides for the transmission of data for a UE from more than one point in the CoMP cluster for the same time-frequency resource. Joint processing CoMP may offer an improved spectral efficiency, especially at for the cell-edge user. Joint processing CoMP can maximize system performance, which is achieved mainly with channel information-based precoding algorithms. Precoding methods perform differently in various CoMP scenarios.

Joint processing CoMP scenarios described herein include multiple geographically separated eNBs coordinated to create beams which are transmitted from across the multiple geographically separated eNBs. For purposes of this disclosure, transmitting entities such as eNBs, RRHs, relays, gNBs, TRPs, and the like, will be referred to generically as eNBs. In operation, such coordination utilizes centralized processing at a central eNB with ideal connections (e.g., fiber optic, super conductor, etc.) to the other coordinating eNBs in the CoMP cluster. In essence, coordinating eNBs operate like a large area MIMO system with geographically distributed eNBs and UEs.

Assuming N cooperating eNBs serving M UEs simultaneously, the composite channel may be written as:

$$\begin{bmatrix} H_{1,1} & H_{1,2} & \cdots & H_{1,c} & \cdots \\ H_{2,1} & H_{2,2} & \cdots & H_{2,c} & \cdots \\ \vdots & \vdots & \vdots & \vdots & \vdots \\ \vdots & \vdots & \ddots & \ddots & \cdots \\ H_{u,1} & H_{u,2} & \cdots & H_{u,c} & \cdots \\ \vdots & \vdots & \vdots & \vdots & \vdots \end{bmatrix} \quad (1)$$

Where, H represents the channel matrix, u represents the index of the M UEs, and c represents the index of the N cooperating eNBs. The beams to the M UEs may be determined to maximize the useful energy of the beam while minimizing the interference created by the beams to the other UEs. Such beams may be generated using various calculations. A typical beamforming strategy may be formulated to minimize interference and maximize desired signal strength. In one example, the beams to the M UEs may be determined to maximize the signal-to-interference-plus-leakage ratio (SILR) as follows:

$$W_{:,u} = \arg\max_{\|w\|^2 = P_s} \frac{|H_{u,:}w|^2}{1 + \sum_{u' \neq u} |H_{u',:}w|^2} \quad (2)$$

Where W represents the beamforming matrix.

Multiple operators may deploy CoMP systems within the same geographical area on the same (e.g. shared or unlicensed) spectrum. However, without coordinating the cross-operator interference, such a CoMP deployment is unlikely to be useful. One possible solution may be time division multiplex (TDM) sharing of the medium among multiple operators. With such TDM sharing, participating entities (eNBs and UEs) may semi-statically negotiate time slots for transmissions, where a given time slot would be dedicated to an operator. Thus, eNBs/UEs belonging to the one operator would not be allowed to transmit in time slots dedicated to the other operators. Alternatively, the eNBs of different operators may contend for the medium using listen before talk (LBT) operations for a dynamic TDM sharing, which typically achieves better medium utilization and therefore better performance than the semi-static TDM.

Another possible solution may be frequency division multiplex (FDM) sharing of the medium among the multiple operators. For example, the participating entities of the various operators may semi-statically negotiate for frequency bands (or subbands, RBs, subcarriers). A given frequency band would be dedicated to one operator, such that eNBs/UEs belonging to one operator would not be allowed to transmit on the frequency band dedicated to the other operators. When different operators are not synchronous to each other, guard bands can be inserted for FDM with subbands/RBs/subcarriers in order to minimize the intercarrier interference. Alternatively, eNBs of different operators may contend for the medium for each frequency band using LBT operations.

Another possible solution may be for multiple operators to employ a centralized joint CoMP, in which case the multiple operator scenario essentially turns into a single operator CoMP. Such a joint CoMP operation between multiple operators would use a centralized scheduler and exchange backhaul data across operators.

Various aspects of the present disclosure are directed to CoMP operations that rely on transmissions from UEs to coordinate scheduling and beam selections. The various aspects assume that the scheduling may be performed independently within each operator, and that there is no backhaul data exchange between operators, thus, no need for an ideal backhaul connection between eNBs of the different operators.

Figure 3:
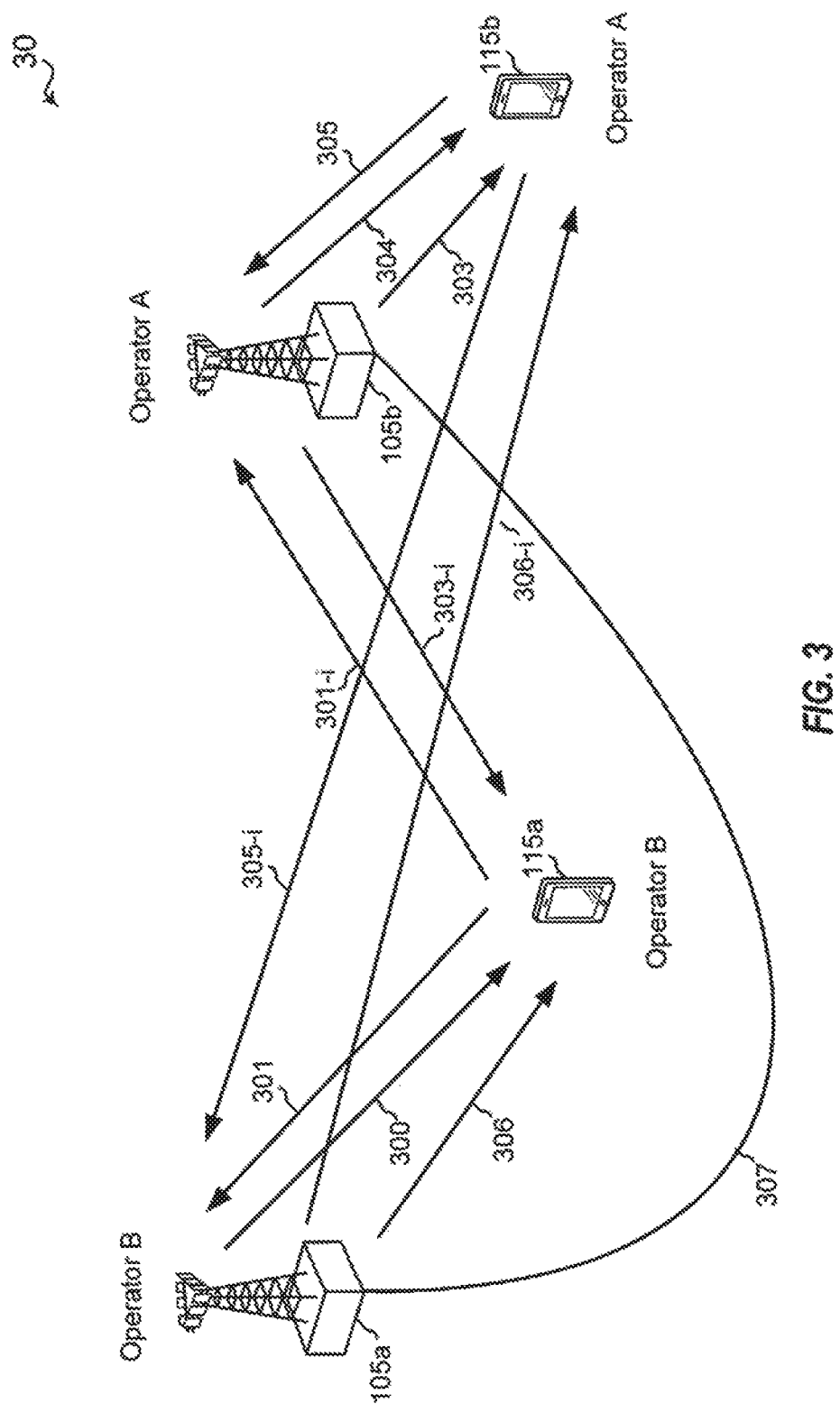
FIG. 3 is a block diagram illustrating joint CoMP operation with eNBs and UEs configured according to one aspect of the present disclosure.

FIG. 3 is a block diagram illustrating joint CoMP operation 30 with eNBs 105a and 105b, and UEs 115a and 115b configured according to one aspect of the present disclosure. eNB 105b and UE 115b belong to operator A, while eNB 105a and UE 115a belong to operator B. In the example aspect, CoMP coordination may be implemented using sounding reference signals (SRS) received from the UEs. In time division duplex (TDD) systems, SRS signals on the uplink may be used to estimate the channel on the downlink as well, through channel reciprocity. In this proposed aspect, eNB 105a sends an SRS request 300 to UE 115a, to which UE 115a responds by transmitting SRS 301. SRS transmission from UEs, such as UE 115a, belonging to one operator ("operator B") may be overheard by eNBs of the other operators. For example, as UE 115a transmits SRS 301 to eNB 105a, eNB 105b ("operator A"), overhears the interference of SRS 301 at SRS 301-i.

Scheduling decisions and beam selection at eNB 105b of "operator A" may then be made such that the CoMP transmission (data transmission 303) from eNB 105b to UE 115b of "operator A" may cause little interference, interference signal 303-i, to UEs belonging to "operator B", such as UE 115a. This is possible because eNB 105a of "operator A" knows the channel for UEs of "operator B" via the overheard SRS 301-i. While illustrated as single entities, eNB 105b and UE 115b may, in fact be representative of a group of multiple eNBs and UEs belonging to operator A. Similarly, the illustration of eNB 105a and UE 115a may represent a group of multiple eNBs and UEs belonging to operator B. With this approach, coordinating joint operator CoMP operations using TDM/FDM would no longer be needed. That is, eNBs of "operator A" (eNB 105b) and "operator B" (eNB 105a) can transmit at the same time to their respective UEs (e.g., UE 115b and 115a).

Similar beamforming selection operations may be implemented at operator B using SRS transmissions from UE 115b within operator A. For example, eNB 105b transmits SRS request 304, to which UE 115b responds with SRS 305. SRS 305 is overheard at eNB 105a through SRS interference 305-i, which eNB 105a uses in scheduling and beam selection so that the CoMP transmission (data transmission 306) from eNB 105a to UE 115a causes little interference (SRS 306-i) to UE 115b at operator A.

In one example aspect, CoMP operations may include a signal-to-leakage ratio (SLR) precoding scheme used for multiuser interference minimization. The SLR-based CoMP operations may be represented by equation (3) below. For the transmission from an eNB of an operator A, the cells, $Cell_c$ to $UE_u$, are from operator A, while the UEs include both UEs served by operator A and B, and the beams from operator A are decided accordingly. Conversely, if an eNB of operator B decides to transmit at the same time, the cells of equation (3) are from operator B, while the UEs include both served by operator B and A and the beams from operator B are, again, decided accordingly.

$$\begin{bmatrix} H_{1,1} & H_{1,2} & \cdots & H_{1,c} & \cdots \\ H_{2,1} & H_{2,2} & \cdots & H_{2,c} & \cdots \\ \vdots & \vdots & \vdots & \vdots & \\ \vdots & \vdots & \ddots & \ddots & \cdots \\ H_{u,1} & H_{u,2} & \cdots & H_{u,c} & \cdots \\ \vdots & \vdots & \vdots & \vdots & \end{bmatrix} \begin{bmatrix} W_{1,1} & W_{1,2} & \cdots & W_{1,u} & \cdots \\ W_{2,1} & W_{2,2} & \cdots & W_{2,u} & \cdots \\ \vdots & \vdots & \vdots & \vdots & \\ \vdots & \vdots & \ddots & \ddots & \cdots \\ W_{c,1} & W_{c,2} & \cdots & W_{c,u} & \cdots \\ \vdots & \vdots & \vdots & \vdots & \end{bmatrix} \begin{bmatrix} s_1 \\ s_2 \\ \vdots \\ s_u \\ \vdots \end{bmatrix} \quad (3)$$

Where, s represents the data packet for transmission to the UE, and the SLR is represented by the ratio of the maximized useful energy and minimized interference identified in equation (2) below:

$$W_{:,u} = \arg \underset{\|w\|^2 = P_s}{\max} \frac{|H_{u,:}w|^2}{1 + \sum_{u' \neq u} |H_{u',:}w|^2} \quad (2)$$

To facilitate SRS overheading, eNBs of the two operators (e.g., eNB 105b—operator A, eNB 105a—operator B) may agree in advance on SRS transmission instances via a regular backhaul. Thus, eNB 105a and 105b may negotiate via backhaul 307 to schedule SRS 301 & 305 from UEs 115 & 115b of "operator A" and "operator B" for transmission at different times, or they may be transmitted at the same time using different resources, again, negotiated via backhaul 307. For example, after SRS scheduling negotiations between eNB 105a and 105b via backhaul 307, UE 115a may transmit SRS 301 at a time t, while UE 115b transmits SRS 305 at time t+1, or UE 115a transmits SRS 301 on a set of subcarriers, while UE 115b transmits SRS 305 on another set of subcarriers. By negotiating assignment of time or resource, eNBs know when and where to monitor the SRSs originating from the other operator.

Figure 4:
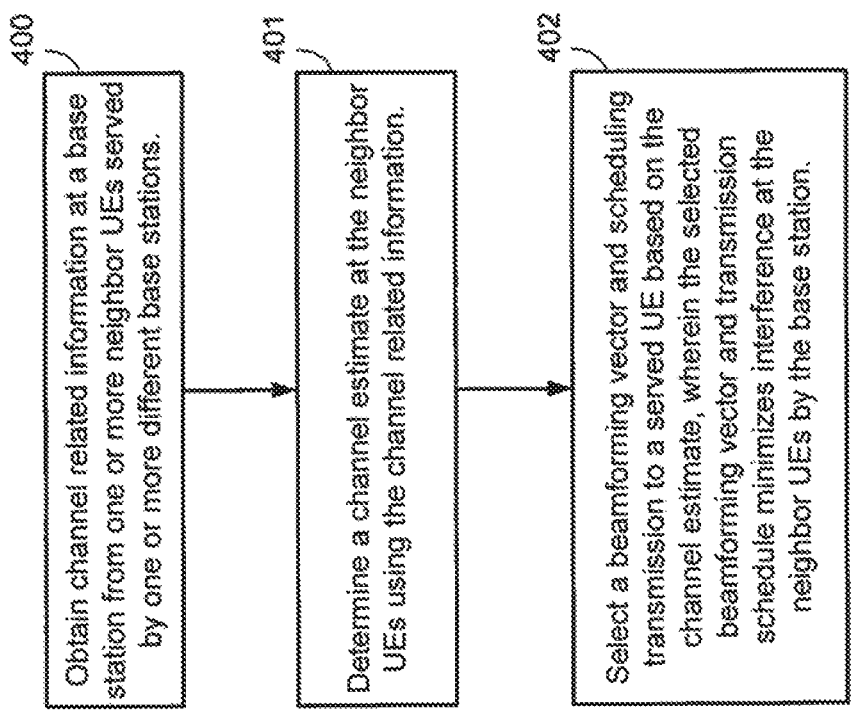
FIG. 4 is a block diagram illustrating example blocks executed to implement one aspect of the present disclosure.
Figure 7:
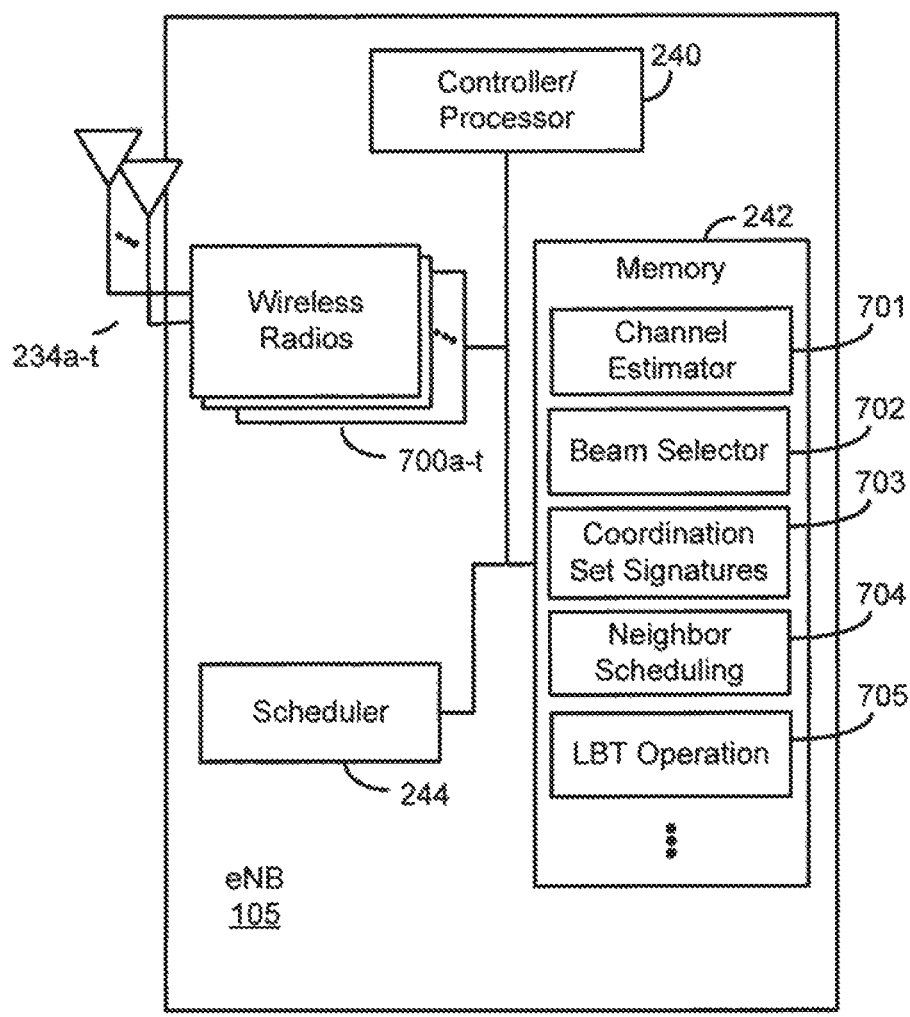
FIG. 7 is a block diagram illustrating an example eNB configured according to aspects of the present disclosure.

FIG. 4 is a block diagram illustrating example blocks executed to implement one aspect of the present disclosure. The example blocks will also be described with respect to eNB 105 as illustrated in FIG. 7. FIG. 7 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 700a-t and antennas 234a-t. Wireless radios 700a-t includes various components and hardware, as illustrated in FIG. 2 for eNB 105, including modulator/demodulators 232a-t, MIMO detector 236, receive processor 238, transmit processor 220, and TX MIMO processor 230.

At block 400, channel related information is obtained at a base station from one or more neighbor UEs served by a different base station. For example, eNB 105, under control of controller/processor 240 receives the channel related information via antennas 234a-t and wireless radios 700a-t. Controller/processor 240 then stores the channel related information in memory 242 at neighbor scheduling 705. In some aspects, the channel related information may include SRS detected from the neighbor UEs. In additional aspects, the channel related information may include CSI reports transmitted from the neighbor UEs.

At block 401, the base station determines a channel estimate at the neighbor UEs using the channel related information. For example, under control of controller/processor 240, eNB 105 executes channel estimator logic 702, stored in memory 242. The execution environment of channel estimator logic 702 uses the channel related information (e.g., SRS, CSI, etc.) to estimate the channel matrix related to the neighbor UEs.

At block 402, the base station selects a beamforming vector and scheduling transmission to a served UE based on the channel estimate, wherein the selected beamforming vector and transmission schedule minimizes interference at the neighbor UEs by the base station. For example, eNB 105 executes beam selector logic 703, under control of controller/processor 240, which uses the channel matrix determined based on the channel related information to select the beams for beamforming the downlink transmissions. Controller/processor 240 controls scheduler 244 also to schedule the downlink transmissions for the served UE.

In additional aspects of the present disclosure, the UE transmissions relied upon for coordinating operations include channel state information (CSI) feedback. The illustrated joint CoMP operation 30 of FIG. 3 may also be used to describe the aspect using CSI feedback. For example, eNB 105b belonging to operator A transmits a signal that may be used by UE 115a to generate CSI report. Such signals may include CSI reference signals (CSI-RS), common reference signals (CRS), or the like, while CSI report 301 may include information such as a channel quality indicator (CQI), precoding matrix indicator (PMI), rank indicator (RI), and the like, reflecting the channel quality observed at UE 115a from the neighboring eNB 105b. The CSI report may be directly received 301-i by the neighboring eNB 105b. Using the CSI information within CSI report 301-i, eNB 105b may execute scheduling decisions and beam selection for data transmission 303 to UE 115b. The CSI information within CSI report 301-i allows eNB 105b to determine the channel for the UEs of operator B, such as UE 115a. For example, with reference to eNB 105 of FIG. 7, the execution environment of channel estimator 701, executed by controller/processor 240, may use the CSI information to generate the channel estimation. Thus, downlink interference 303-i experienced by UE 115b may be minimized. Alternatively, instead of relying on receiving the CSI reports from a neighbor UE, such as CSI report 301-i, the CSI reports may be first received 301 by the serving eNB 105a and then routed via backhaul 307 to the neighboring eNB 105b.

Again, this approach may obviate any solutions for multiple operator CoMP based on TDM or FDM. eNBs of "operator A" and "operator B," such as eNBs 105a and 105b, respectively, can transmit at the same time to their respective UEs. To facilitate reception of the CSI reports from neighbor UEs, eNBs 105a and 105b may agree in advance on CSI feedback instances via backhaul 307. For purposes of the presently described example aspect, backhaul 307 may be either an ideal backhaul or non-ideal backhaul.

Figure 5:
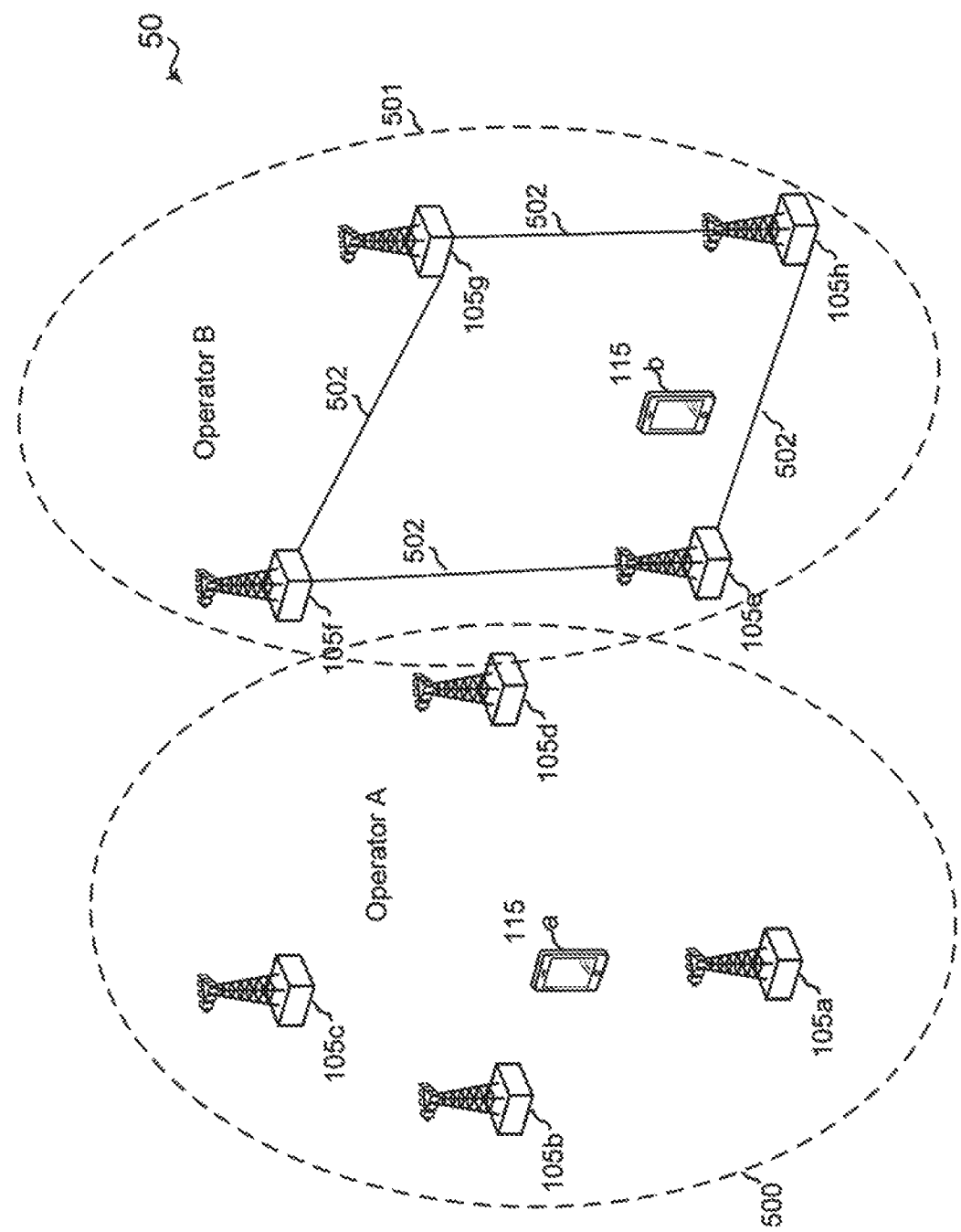
FIG. 5 is a block diagram illustrating eNBs configured for joint CoMP operation according to aspects of the present disclosure.

FIG. 5 is a block diagram illustrating eNBs 105a-105h configured for joint CoMP operation 50 according to aspects of the present disclosure. Joint CoMP operation 50 includes communications over contention-based shared spectrum. Prior to gaining access to, and communicating over, a contention-based shared radio frequency spectrum band, a base station or UE may perform a listen before talk (LBT) procedure to contend for access to the shared spectrum. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reservation signal, such as a channel usage beacon signal (CUBS), WiFi preamble, or the likes, may be transmitted to reserve the channel prior to the data transmission. Under current LBT schemes, the contention checks are performed on a per transmitter basis. As a baseline consideration for CoMP operations, synchronization among antennas of the same operator may be achieved by deferring transmission until all antennas are free to transmit. However, even considering such CoMP considerations, eNBs of different operators within a given CoMP cluster may be forced to share spectrum using TDM. Thus, special consideration should be made with LBT procedures to enable joint CoMP.

Joint CoMP operation 50 includes illustration of two CoMP clusters, CoMP clusters 500 and 501, made up from a collection of eNBs. Here, a CoMP cluster refers to a set of eNBs connected via backhaul and serving their UEs jointly via CoMP joint transmission. In FIG. 3, 105a denotes a CoMP cluster, and 106a denotes another CoMP cluster. In FIG. 5, CoMP cluster 500 includes eNBs 105a-d operated by operator A. UE 115a belongs to operator A and communicates directly through eNBs 105a and 105b. CoMP cluster 501 includes eNBs 105e-h operated by operator B. eNBs 105e-h are also connected via backhaul 502. UE 115b belongs to operator B and communicates directly through eNBs 105e and 105h.

In one aspect of the present disclosure, eNBs 105a-d will perform an LBT procedure prior to any scheduled transmissions. In order to prevent transmissions from one eNB within a cluster 500 from preventing the other eNBs of the same cluster from securing the shared channel for transmission, a signature in the reservation signal may be included that represents CoMP transmission from a member of the cluster. For example, the CUBS transmitted by eNB 105b, if detected during an LBT procedure of eNBs 105a, 105c, or 105d, will identify eNB 105b through a signature in the CUBS as an eNB within its own cluster 500. With reference to eNB 105 of FIG. 7, controller/processor 240 executes LBT operation logic 705, stored in memory 242, to control eNB 105 performing an LBT check. If a CUBS signal is detected on the channel, eNB 105 would decode the signal and check the embedded signature against a list of signatures in cluster signatures 703, in memory 242. When such a signature is detected, eNBs 105a, 105c, and 105d may schedule transmissions along with eNB 105b. Alternatively, the eNBs 105a, 105c, and 105d may perform an additional LBT operation on a received signal after canceling a detected channel reservation signal from 105b, and the eNBs may transmit a scheduled downlink transmission to the one or more served UEs when a channel is determined to be idle according to results of the additional LBT operation. Such an additional LBT operation may be employed because a single LBT operation may not be sufficient due to a detected signal containing multiple signals, one of which may be a reservation signal from 105b and another of which may be a foreign signal (e.g., WiFi). Therefore, the receiver should first cancel out the reservation signal from 105b to see if there is another signal present. If there is another signal present after the cancellation of the reservation signal, then the receiver should not access the medium. This concept may be extended to multiple clusters. For example, eNBs 105e, 105f, 105g, and 105h may schedule transmissions upon detecting CUBS transmitted by eNB 105b. Similarly, eNBs 105e, 105f, 105g, and 105h may perform, upon detecting CUBS transmitted by eNB 105b, an additional LBT operation on a received signal after canceling a detected channel reservation signal from 105b, and the eNBs may transmit a scheduled downlink transmission to the one or more served UEs when a channel is determined to be idle according to results of the additional LBT operation.

In an alternative aspect illustrated by FIG. 5, LBT operations may be performed jointly for each cluster. For example, eNBs 105e-h perform LBT operations and, when the channel is secured by at least one of eNBs 105e-h, CoMP transmissions from any or all of eNBs 105e-h may begin at the same time. In one aspect, the securing of the channel for cluster 501 may be signaled to each of eNBs 105e-h via backhaul 502. In another aspect, one of eNBs 105e-h may be designated as the primary base station which performs the LBT operation, when the primary base station secures the channel, it will signal the other eNBs of the cluster to begin transmissions at the same time.

It should be noted that, while the example aspects described with respect to FIGS. 3 and 5 have described provisions for multiple operators, the features and functionality of the described aspects are equally applicable to other similar operational scenarios, such as: (1) at the boundary (intersection) of multiple clusters belongs to the same operator; (2) at the edge of a CoMP clusters; and (3) in the presence of non-CoMP eNBs within the geographical area of CoMP eNBs.

Figure 6:
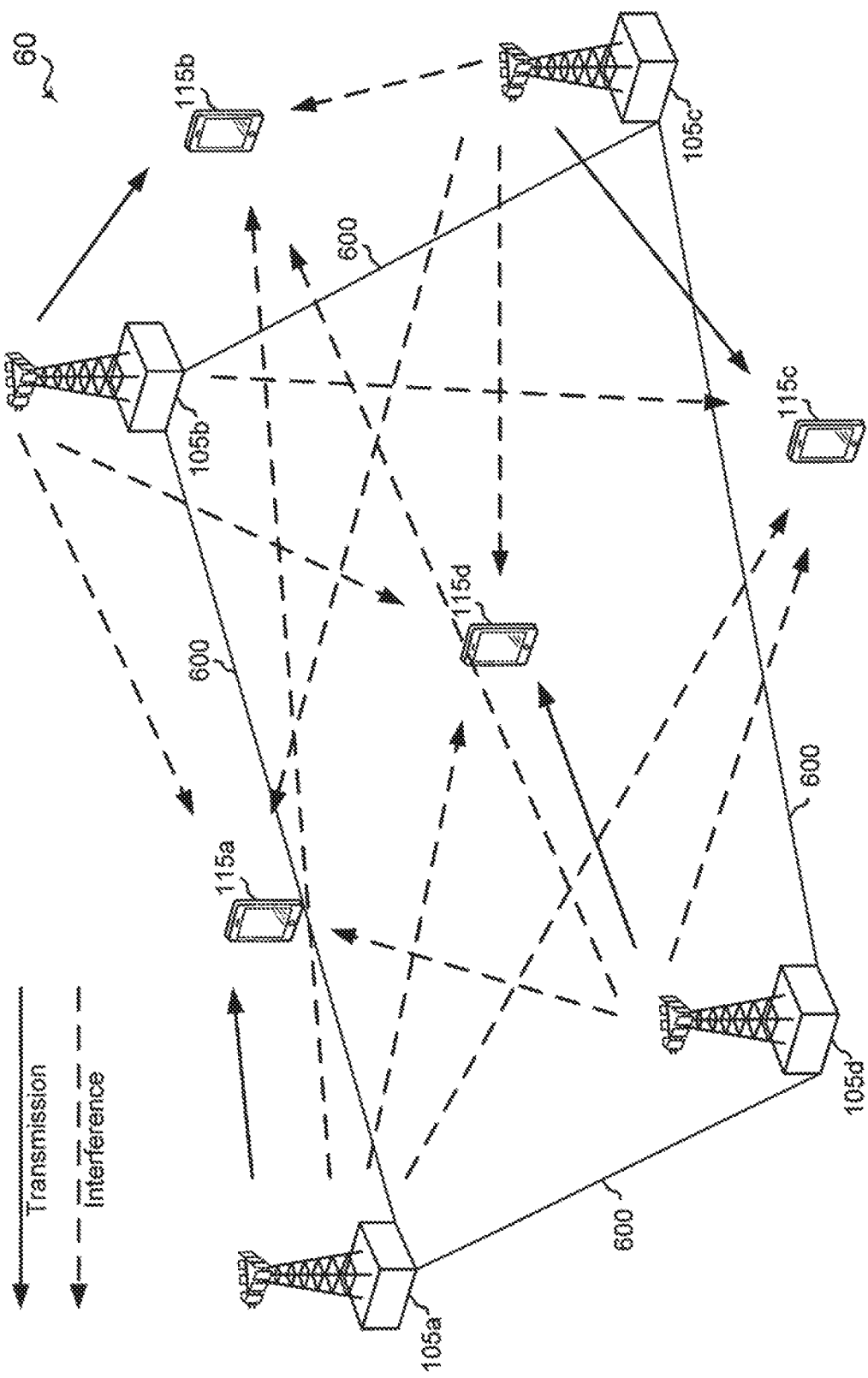
FIG. 6 is a block diagram illustrating eNBs configured according to one aspect of the present disclosure.

FIG. 6 is a block diagram illustrating eNBs 105a-d configured according to one aspect of the present disclosure. The beam selection for each base station may be influenced by the data transmission and user scheduling of other base stations in the area. In one example aspect, joint CoMP operation 60 includes an SLR-based CoMP. eNB 105a includes data queued for transmission to UE 115a. In an LBT burst if eNB 105a is aware that the other eNBs, eNBs 105b-d are not transmitting to UEs 115b-d, then eNB 105a may select beams based on its served UE 115a. However, if eNB 105a is aware that any or all of eNBs 105b-d are scheduled for transmission to UEs 115b-d, eNB 105a may make a different beam selection taking into account the data transmission and user scheduling of the other eNBs 105b-d transmissions to any of UEs 115b-d. The beams are selected in order to minimize the impact of the interference that the beamformed data transmission will have on the UEs served by the other eNBs 105b and 105d. If the operators are not aware of the scheduling of each other, the beam selection can be based on long term statistics, such as path loss, SRS strength, interference statistics, and the like, observed from UEs regarding the other operator. However, this may end up in selection of non-optimal beams when the other operator does not schedule any UEs.

In one example aspect, eNBs involved in CoMP operations exchange the UEs intended for scheduling (for example, every LBT burst, etc). For example, eNBs 105a, 105b, and 105d belong to different operators. eNB 105a intends to schedule transmissions for UE 115a and eNB 105d intends to schedule transmissions for UE 115d. Accordingly, at the predetermined time, eNBs 105a, 105b, and 105d exchange the scheduling information for UEs 115a and 115d. eNBs 105a, 105b, and 105d then select the beams based on all the UEs intended for scheduling across different operators, e.g., UE 115a and 115d. With reference to eNB 105 of FIG. 7, as eNB 105 would receive the scheduling for the neighbor eNBs, the scheduling would be stored at neighbor scheduling 704 in memory 242. The UE selection per operator can be based on priority, beam separation, channel condition, etc. One way for eNBs 105a, 105b, and 105d to exchange UE scheduling information can be based on SRS triggering, such that, for each LBT burst, each operator only triggers the SRS transmission from the intended UEs. In the described example, UEs 115a and 115d would be triggered for SRS transmissions. Thus, if any of eNBs 105a, 105b, and 105d observes the SRS transmission from UEs 115a or 115b, the observing eNB will assume that UEs 115a and 115b will be scheduled in the transmission burst. However, since the UEs are chosen independently by each operator, they may not co-exist well in spatial domain. Operators may try to update the selected UEs based on the feedback from each other. An operator may over-provision SRS requests in order to down-select users for scheduling. However, the over-provisioning may overly limit the other operators. Therefore, the level of over-provisioning may need to be balanced against the operations of the other eNBs.

In an additional example aspect, at each LBT burst, there is a notion of a primary operator and secondary operators. The primary operator schedules its UEs first. The primary operator may then convey its scheduling decision to secondary operators via backhaul 600. The primary operator may further advertise the interference level that may be tolerated from the secondary operators. For example, at the first LBT burst, eNB 105a is the primary operator. eNB 105a schedules UE 115a for downlink transmissions and reports the scheduling information and tolerable interference level to eNBs 105b and 105d via backhaul 600. The secondary operators, eNBs 105b and 105d can schedule their own UEs, UEs 115b and 115d, and select the beams conditioned on the expected interference level consistent with the allowed level communicated from eNB 105a. Since UEs served by the secondary operators may suffer from higher interference from the primary operator, eNB 105a, eNB 105a may vary one LBT burst to another or semi-statically to maintain an equal share of medium and priority between them.

In an alternative aspect, the eNB between eNBs 105a, 105b, and 105d that first wins the LBT may become the primary operator, while the other operator(s) that transmit subsequently may act as the secondary operator. For example, each of eNBs 105a, 105b, and 105d perform LBT operations. eNB 105d is the first to secure the channel and, thus, becomes primary operator. eNB 105d, therefore, schedules UE 115d for transmission, and eNB 105d sends the scheduling information for UE 115d, beams selected, and tolerable interference level to eNBs 105a and 105b via backhaul 600. eNBs 105a and 105b become secondary operators and schedule UE 115a and 115b, respectively, if data are queued, using beams selected based on the scheduled transmission beam selection for transmission to UE 115d. When two or more CoMP networks both have successful LBT, it is also possible for one CoMP network to be given higher priority over another CoMP network on one or more predefined occasions, and for the other CoMP network to given higher priority on one or more other predefined occasions. Thus, CoMP networks may take turns being primary operators for a transmission resource. Such assignment and/or reassignment of the primary operator role may be performed pseudo-randomly, according to a schedule that divides resources evenly among CoMP networks and/or operators, and/or predefined fairness mechanism. Such a fairness mechanism may assign and/or reassign primary operator status among CoMP networks taking into account various factors, such as importance of messages to be transmitted, message type, QoS requirements, CoMP network size, and/or CoMP network load. The role of primary operator may not be reassigned unless one or more predefined conditions are met, such as a determination that the CoMP networks are of equal status, based on whether CoMP networks are of the same operator, or based on terms and conditions negotiated between different operators.

It should be noted that eNB 105c may not coordinate with CoMP clusters 105a, 105b, and 105d, or may not be involved in CoMP operations at all. The example aspects described herein may also be used in conjunction with eNB 105c in order to perform beam selection and transmission scheduling for the CoMP transmissions of any of eNBs 105a, 105b, and 105d based on transmission information and beam selection of eNB 105c.

With CoMP, even if a node observes CCA energy below the energy detection (ED) threshold, it is possible that the beam selection of other nodes near to the observing node does not incur much energy leakage. In this case, it may not be guaranteed that the observing node's own transmission does not cause significant interference to other nearby nodes. By communicating scheduling information between the primary and secondary operators, the secondary operators may select beams and schedule their own transmissions to avoid injecting high interference levels to the primary operator, as LBT based on CCA alone may not be sufficient with CoMP operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   obtaining channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations;
   determining channel estimates for the one or more neighbor UEs and the one or more served UEs using the channel related information;
   observing long term statistics associated with the one or more neighbor UEs served by the second CoMP network; and
   selecting beamforming vectors and scheduling downlink transmission to the one or more served UEs based on the channel estimates, wherein the selected beamforming vectors and scheduled downlink transmission by the base station of the first CoMP network minimize interference at the one or more neighbor UEs, wherein the selecting the beamforming vectors and scheduling downlink transmissions are further based on the observed long term statistics, wherein the observed long term statistics include one or more of path loss or sounding reference signal (SRS) strength.

2. The method of claim 1, wherein the first CoMP network is operated by a first mobile operator, and the second CoMP network is operated by a second mobile operator.

3. The method of claim 1, wherein the channel related information includes the SRS transmitted by the one or more neighbor UEs and the one or more served UEs, and wherein the channel estimates are determined using channel reciprocity.

4. The method of claim 3, further including:
   exchanging SRS scheduling information with the second CoMP network serving the one or more neighbor UEs, wherein the SRS scheduling information identifies one or more of timing or resources for transmission of the SRS.

5. The method of claim 1, wherein the channel related information includes channel state information (CSI) reported from the one or more neighbor UEs, in which the CSI reflects one or more interfering channels between the first CoMP network and the one or more neighbor UEs of the second CoMP network.

6. The method of claim 5, further including:
   exchanging CSI scheduling information with the second CoMP network serving the one or more neighbor UEs, wherein the CSI scheduling information identifies CSI feedback instances.

7. The method of claim 1, wherein the channel related information includes channel state information (CSI) reported from the second CoMP network, in which the CSI reflects one or more interfering channels between the first CoMP network and the one or more neighbor UEs of the second CoMP network.

8. The method of claim 1, further including:
   performing, by the base station, a listen before talk (LBT) operation on a contention-based shared spectrum prior to transmitting the scheduled downlink transmission to the one or more served UEs;
   detecting a channel reservation signal on the contention-based shared spectrum;
   determining that the channel reservation signal includes an identifier indicating a transmitter of the channel reservation signal as a member of the first CoMP network or the second CoMP network; and
   transmitting the scheduled downlink transmission to the one or more served UEs.

9. The method of claim 8, further including:
   performing an additional LBT operation on received signal after canceling the detected channel reservation signal of the first CoMP network or the second CoMP network; and
   transmitting the scheduled downlink transmission to the one or more served UEs when a channel is determined to be idle according to results of the additional LBT operation.

10. The method of claim 1, further including:
    performing a listen before talk (LBT) operation on a contention-based shared spectrum prior to transmitting the scheduled downlink transmission to the one or more served UEs, wherein the LBT operation is performed jointly with one or more of:
    one or more other base stations of the plurality of base stations in the first CoMP network; or
    one or more base stations of the plurality of other base stations in the second CoMP network; and
    transmitting the scheduled downlink transmission when a clearance of the contention-based shared spectrum is detected by the base station.

11. The method of claim 1, further including:
    receiving from the second CoMP network, an indication of scheduling of downlink transmissions for ones of the one or more neighbor UEs, wherein the determining the channel estimates is performed for the ones of the one or more neighbor UEs for which the indication is received.

12. The method of claim 11, further including:
    triggering, by the second CoMP network, transmission of SRS by the one or more UEs when the one or more UEs are to be scheduled for downlink transmissions, wherein the receiving the indication includes detecting, by the first CoMP network, SRS transmission from the ones of the one or more UEs of the second CoMP network.

13. The method of claim 11, further including:
triggering, by the second CoMP network, transmission of SRS by the one or more UEs when the one or more UEs are candidate UEs for downlink transmissions, wherein the receiving the indication includes detecting, by the first CoMP network, SRS transmission from the ones of the one or more UEs of the second CoMP network.

14. The method of claim 1, further comprising:
receiving a maximum tolerable interference threshold from the second CoMP network, wherein the selecting the beamforming vectors and scheduling downlink transmission by the base station of the first CoMP network are further based on ensuring the interference caused to the second CoMP network to be within the maximum tolerable interference threshold.

15. The method of claim 1, wherein the second CoMP network selects beamforming vectors and schedules downlink transmission to one or more of its served UEs, wherein the selected beamforming vectors and scheduled downlink transmission by the base station of the second CoMP network minimize interference at the one or more UEs of the first CoMP network.

16. The method of claim 1, further including:
performing a listen before talk (LBT) operation on a contention-based shared spectrum prior to transmitting the scheduled downlink transmission to the one or more served UEs, wherein the LBT operation is performed along with one or more LBT operations for one or more of the plurality of other base stations in the second CoMP network,
wherein, in response to both the first CoMP network and the second CoMP network having successful LBT, the first CoMP network is given higher priority over the second CoMP network.

17. The method of claim 16, further including:
in response to both the first CoMP network and the second CoMP network having successful LBT, the first CoMP network is given higher priority over the second CoMP network on one or more predefined occasions, and the second CoMP network is given higher priority over the first CoMP network on one or more other predefined occasions.

18. An apparatus configured for wireless communication, comprising:
means for obtaining channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations;
means for determining channel estimates for the one or more neighbor UEs and the one or more served UEs using the channel related information;
means for observing long term statistics associated with the one or more neighbor UEs served by the second CoMP network; and
means for selecting beamforming vectors and means for scheduling downlink transmission to the one or more served UEs based on the channel estimates, wherein the selected beamforming vectors and scheduled downlink transmission by the base station of the first CoMP network minimize interference at the one or more neighbor UEs, wherein the means for selecting the beamforming vectors and means for scheduling downlink transmissions are further based on the observed long term statistics, wherein the observed long term statistics include one or more of path loss or sounding reference signal (SRS) strength.

19. A non-transitory computer-readable medium having program code recorded thereon, the program code comprising:
program code executable by a computer for causing the computer to obtain channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations;
program code executable by the computer for causing the computer to determine channel estimates for the one or more neighbor UEs and the one or more served UEs using the channel related information;
program code executable by the computer for causing the computer to observe long term statistics associated with the one or more neighbor UEs served by the second CoMP network; and
program code executable by the computer for causing the computer to select beamforming vectors and program code executable by the computer for causing the computer to schedule downlink transmission to the one or more served UEs based on the channel estimates, wherein the selected beamforming vectors and scheduled downlink transmission by the base station of the first CoMP network minimize interference at the one or more neighbor UEs, wherein the program code executable by the computer for causing the computer to select the beamforming vectors and the program code executable by the computer for causing the computer to schedule downlink transmissions are further based on the observed long term statistics, wherein the observed long term statistics include one or more of path loss or sounding reference signal (SRS) strength.

20. An apparatus configured for wireless communication, the apparatus comprising:
at least one processor; and
a memory coupled to the at least one processor,
wherein the at least one processor is configured:
to obtain channel related information at a base station of a first coordinated multipoint (CoMP) network from one or more neighbor user equipments (UEs) served by a second CoMP network and one or more served UEs served by the first CoMP network, wherein the first CoMP network includes a plurality of base stations, and the second CoMP network includes a plurality of other base stations;
to determine channel estimates for the one or more neighbor UEs and the one or more served UEs using the channel related information;
to observe long term statistics associated with the one or more neighbor UEs served by the second CoMP network; and
to select beamforming vectors and program code executable by the at least one processor for causing the at least one processor to schedule downlink transmission to the one or more served UEs based on the channel estimates, wherein the selected beamforming vectors and scheduled downlink transmission by the base station of the first CoMP network minimize interference at the one or more neighbor UEs, wherein the selecting the beamforming vectors and scheduling downlink transmissions are further based on the observed long term statistics, wherein the observed long term statistics include one or more of path loss or sounding reference signal (SRS) strength.

21. The apparatus of claim 20, wherein the channel related information includes at least one of:
the SRS transmitted by the one or more neighbor UEs and the one or more served UEs, and wherein the channel estimates are determined using channel reciprocity;
channel state information (CSI) reported from the one or more neighbor UEs, in which the CSI reflects one or more interfering channels between the first CoMP network and the one or more neighbor UEs of the second CoMP network; or
CSI reported from the second CoMP network, in which the CSI reflects one or more interfering channels between the first CoMP network and the one or more neighbor UEs of the second CoMP network.

22. The apparatus of claim 20, wherein the at least one processor is further configured:
to perform, by the base station, a listen before talk (LBT) operation on a contention-based shared spectrum prior to transmitting the scheduled downlink transmission to the one or more served UEs;
to detect a channel reservation signal on the contention-based shared spectrum;
to determine determining that the channel reservation signal includes an identifier indicating a transmitter of the channel reservation signal as a member of the first CoMP network or the second CoMP network; and
to transmit the scheduled downlink transmission to the one or more served UEs.

23. The apparatus of claim 20, wherein the at least one processor is further configured:
to perform a listen before talk (LBT) operation on a contention-based shared spectrum prior to transmitting the scheduled downlink transmission to the one or more served UEs, wherein the LBT operation is performed jointly with one or more of:
one or more other base stations of the plurality of base stations in the first CoMP network; or
one or more base stations of the plurality of other base stations in the second CoMP network; and
to transmit the scheduled downlink transmission when a clearance of the contention-based shared spectrum is detected by the base station.

24. The apparatus of claim 20, wherein the at least one processor is further configured:
to receive from the second CoMP network, an indication of scheduling of downlink transmissions for ones of the one or more neighbor UEs, wherein the determining the channel estimates is performed for the ones of the one or more neighbor UEs for which the indication is received.

25. The apparatus of claim 20, wherein the at least one processor is further configured:
to receive a maximum tolerable interference threshold from the second CoMP network, wherein the selecting the beamforming vectors and scheduling downlink transmission by the base station of the first CoMP network are further based on ensuring the interference caused to the second CoMP network to be within the maximum tolerable interference threshold.

26. The apparatus of claim 20, wherein the at least one processor is further configured:
to perform a listen before talk (LBT) operation on a contention-based shared spectrum prior to transmitting the scheduled downlink transmission to the one or more served UEs, wherein the LBT operation is performed along with one or more LBT operations for one or more of the plurality of other base stations in the second CoMP network,
wherein, in response to both the first CoMP network and the second CoMP network having successful LBT, the first CoMP network is given higher priority over the second CoMP network.

* * * * *